2 Sheets--Sheet 1.

J. MAHONY.
Ships' Berths.

No. 163,020.                    Patented May 11, 1875.

Witnesses:                      Inventor:

2 Sheets--Sheet 2.

J. MAHONY.
Ships' Berths.

No. 163,020. Patented May 11, 1875.

Witnesses:   Inventor:
   James Mahony
   By his attorney
   Thomas L. Stetson

UNITED STATES PATENT OFFICE.

JAMES MAHONY, OF NEWPORT, RHODE ISLAND.

IMPROVEMENT IN SHIPS' BERTHS.

Specification forming part of Letters Patent No. 163,020, dated May 11, 1875; application filed March 30, 1875.

*To all whom it may concern:*

Be it known that I, JAMES MAHONY, master mechanic of the Old Colony Steamboat Company, residing at Newport, in the State of Rhode Island, have invented certain Improvements relating to Berths on Shipboard, of which the following is a specification:

I have devised a system of framing peculiarly hinged to the upper deck, and having posts, which, on being let down, are inserted in holes in the main deck. The berths are so mounted upon or suspended from this framing as to allow the whole to be conveniently lifted and stowed in a small compass under the upper deck when the berths are not required for use. This leaves the main portion of the space clear for stowing of freight or other uses, and the berths being all kept permanently connected in their places, no danger of confusion or mistake can arise, even if operated with little light, and by ignorant or careless men. They can be gathered up and extended down with little labor or time.

Sleeping-car berths and hammocks have been before employed having some of the qualities of my invention; but I am not aware of any previous device capable of stowing in this manner, having the same rigidity when in use, and which may be so cheaply constructed, and which is adapted for rough usage on vessels.

My hinged berths are intended more especially for the accommodation of second-class and emigrant passengers. The framing, being of iron, galvanized, or otherwise defended against oxidation, is little liable to harbor vermin.

The following is a description of what I consider the best means of carrying out the invention.

The accompanying drawings form a part of this specification.

Figure 1:
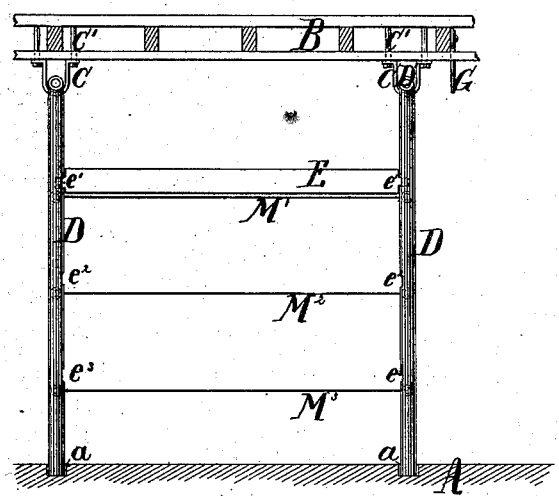
Figure 2:
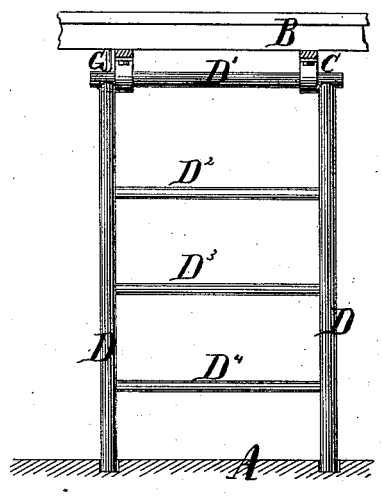
Figure 3:
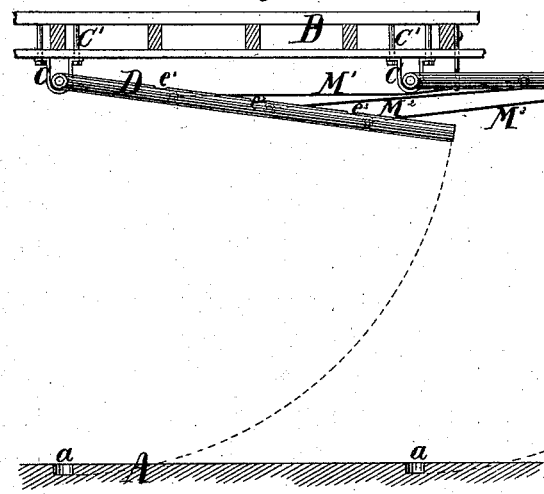
Figure 4:

Figure 1 is a side elevation, and Fig. 2 an end view, representing the device in condition for use. Fig. 3 is a side elevation, and Fig. 4 an end view, representing the device stowed away to allow room for freight or the like.

The additional figures represent modifications which will be described further on.

Similar letters of reference indicate corresponding parts in all the figures.

The drawings represent the novel parts with so much of the ordinary parts as is necessary to indicate their relation thereto.

A is the lower deck, formed with holes $a$ of sufficient diameter and depth to receive and firmly retain the feet of my hinged uprights. The upper deck is formed with cross-timbers, and with longitudinal strips of wood below the cross-timbers, as indicated in the figures. I will designate the whole wood-work of the upper deck by the single letter B. Straps of iron, C, are firmly bolted to the upper deck B by through-bolts C'. The straps C embrace cross-pieces $D^1$ of iron tubing, to which are firmly welded or otherwise rigidly secured posts D, having cross-bars $D^2$ $D^3$ $D^4$. The straps or loops C form hinges for the frames D, which allow them to be moved upward and downward within the limits prescribed by the depth of the loops C. These limits should be sufficient to allow the frames to be raised and lowered to an extent of four inches, more or less. They thus allow the posts to be raised out of the holes $a$, and lowered into them in addition to their serving as hinges for the swinging up of the frames and their attachments. $M^1$ $M^2$ $M^3$ are broad pieces of stout canvas or sacking, adapted to support mattresses or other bedding. Holes $e^1$ $e^2$ $e^3$ in the sides of the posts D allow the insertion of rigid bars, which may preferably be of oak or other suitable wood to form rigid sides to the berths.

Figs. 1 and 2 show the apparatus in condition for use. The upper berth only is shown with the side pieces E. It will be understood that the other berths may have the same.

When it is desired to employ the space for freight, the side pieces E are first removed; then the several posts D are lifted out of the holes $a$ in the main deck. The deep loops C, forming peculiar hinges, allow of this motion. Next the several frames D $D^1$ $D^2$ are simultaneously or successively turned up into the horizontal position, and secured by means of hooks G, or otherwise. In performing this movement, as also being again lowered into position for use, the frames turn in the loops C, which serve as hinges for this motion. The flexible canvas $M^1$ $M^2$, &c., will allow the folding of the frames in the manner described, and will stow in a small compass, the blankets, sheets, and mattresses being removed and safely stored in some suitable place.

Figure 5:
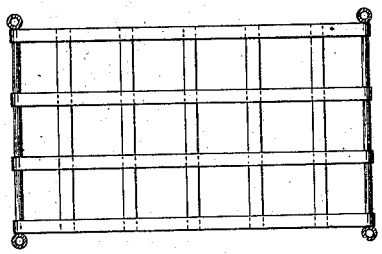
Figure 6:
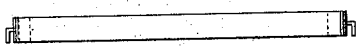
Figures 7, 8, 9, 10:
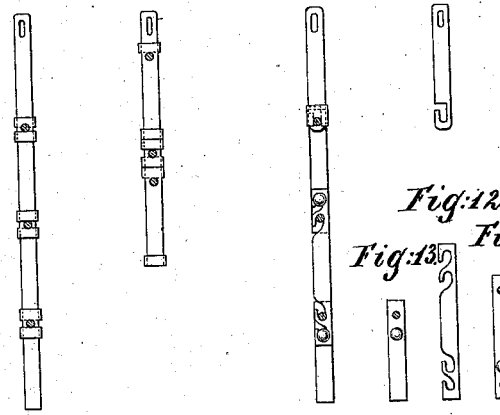
Figures 11, 12, 13:
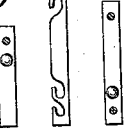

Many of the details may be modified within wide limits. Thus, for example, instead of canvas or the flexible material $M^1$ $M^2$, &c., I can employ strips of metal properly connected together, the strips being either in the form of narrow lengths of sheet metal, or wire-netting or the like. A suitable construction for such is shown in plan in Fig. 5. Instead of rigid side bars, I can employ broad flexible bands of canvas provided with iron hooks to engage in the holes $e$ in the posts. A suitable form for such flexible side pieces is indicated in Fig. 6. The posts D, instead of being in single rigid lengths, may be made up of several pieces, made telescopic, or hooked together in various ways. Figs. 7 to 13 indicate some of the modifications which I esteem practicable for such purposes.

The deep loops C should allow all the vertical motion which is necessary, while presenting a firm support both laterally and fore and aft, to prevent the upper end of the frames D from moving or rattling to any considerable extent while the berths are in use. They allow a vertical motion and swinging motion, but no other.

I claim as my invention—

The frames D $D^1$ $D^2$, both turning and sliding vertically in deep loops C, in combination with such loops, allowing vertical motion, and with sockets $a$ in the deck below, adapted to support the beds $M^1$ $M^2$, and allow the whole to be readily folded, extended, and firmly placed and supported, as herein set forth.

In testimony whereof I have hereunto set my hand this 26th day of March, 1875, in the presence of two subscribing witnesses.

JAMES MAHONY.

Witnesses:
   BENJAMIN MARSH, 2d,
   CHAS. D. HAMMETT.